United States Patent
Burns

(10) Patent No.: US 9,537,737 B2
(45) Date of Patent: *Jan. 3, 2017

(54) CONSOLIDATED PERFORMANCE METRIC ANALYSIS

(71) Applicant: COMCAST CABLE COMMUNICATIONS, LLC, Philadelphia, PA (US)

(72) Inventor: Kevin Patrick Burns, Greenwood Village, CO (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/809,553

(22) Filed: Jul. 27, 2015

(65) Prior Publication Data

US 2015/0333984 A1    Nov. 19, 2015

Related U.S. Application Data

(63) Continuation of application No. 13/835,433, filed on Mar. 15, 2013, now Pat. No. 9,124,490.

(51) Int. Cl.
*G06F 15/16* (2006.01)
*H04L 12/26* (2006.01)

(52) U.S. Cl.
CPC ............ *H04L 43/06* (2013.01); *H04L 43/04* (2013.01); *H04L 43/067* (2013.01); *H04L 43/08* (2013.01); *H04L 43/0876* (2013.01)

(58) Field of Classification Search
CPC ........ H04L 43/06; H04L 43/04; H04L 43/067; H04L 43/08; H04L 43/0876
See application file for complete search history.

(56) References Cited

U.S. PATENT DOCUMENTS

| | | | | |
|---|---|---|---|---|
| 7,970,897 B1* | 6/2011 | Baumback | ............ | G06F 9/5061 709/217 |
| 8,656,224 B2 | 2/2014 | Duchenay et al. | | |
| 8,656,225 B2 | 2/2014 | Duchenay et al. | | |
| 9,088,460 B2* | 7/2015 | Baumback | ............ | G06F 9/5061 |
| 9,124,490 B2* | 9/2015 | Burns | ............ | H04L 43/04 |
| 2011/0252143 A1* | 10/2011 | Baumback | ............ | G06F 9/5061 709/226 |
| 2012/0066558 A1 | 3/2012 | Duchenay et al. | | |
| 2012/0216082 A1* | 8/2012 | Duchenay | ............ | H04L 41/064 714/57 |
| 2012/0233322 A1* | 9/2012 | Baumback | ............ | G06F 9/5061 709/224 |
| 2013/0212167 A1* | 8/2013 | Baumback | ............ | G06F 9/5061 709/203 |
| 2014/0149575 A1 | 5/2014 | Blackwell et al. | | |
| 2015/0146675 A1* | 5/2015 | Zhang | ............ | H04L 41/0816 370/329 |
| 2015/0326491 A1* | 11/2015 | Baumback | ............ | G06F 9/5061 709/226 |

OTHER PUBLICATIONS

European Office Action—EP Appl. 14159882.1—dated Jan. 7, 2016.

* cited by examiner

*Primary Examiner* — Moustafa M Meky
(74) *Attorney, Agent, or Firm* — Banner & Witcoff, Ltd.

(57) ABSTRACT

Performance metrics may be received from multiple data processing elements associated with a performance metric domain and a consolidated performance metric may be determined. Grouping the performance metrics into performance metric groups may be performed based on their respective associations with different aspects of the data processing elements.

20 Claims, 7 Drawing Sheets

CONSOLIDATED PERFORMANCE METRIC ANALYSIS

CROSS-REFERENCE TO RELATED APPLICATIONS

The present application is a continuation of U.S. patent application Ser. No. 13/835,433, filed Mar. 15, 2013. This application is hereby incorporated by reference in its entirety.

BACKGROUND

Performance data is available from a wide variety of computing devices. While performance data can be utilized by users, administrators, system architects, and the like, the sheer volume of performance data available can be overwhelming and may degrade its utility. Because the volume of performance data available will only increase as computing devices continue to evolve, there remains an ever-present need to refine and consolidate such performance data.

SUMMARY

In accordance with one or more aspects of the disclosure, performance metrics may be received from multiple data processing elements associated with a performance metric domain and a consolidated performance metric for the performance metric domain may be calculated or otherwise determined based on the performance metrics. Calculating the consolidated performance metric for the performance metric domain may include grouping the performance metrics into performance metric groups based on their respective associations with different aspects of the data processing elements, calculating constituent consolidated performance metrics, and calculating the consolidated performance metric for the performance metric domain based on the constituent consolidated performance metrics.

In some embodiments, a first plurality of performance metrics may be received from a plurality of data processing elements associated with a performance metric domain at a first time. A second plurality of performance metrics may be received from the plurality of data processing elements associated with the performance metric domain at a second time subsequent to or partially overlapping the first time. A first and second group of related performance metrics may be identified. The first group may include a portion of the first plurality of performance metrics that pertain to a first aspect set and a portion of the second plurality of performance metrics that pertain to the first aspect set. The second group may include a portion of the first plurality of performance metrics that pertain to a second aspect set and a portion of the second plurality of performance metrics that pertain to the second aspect set. A first consolidated performance metric for the first aspect set may be calculated based on the first group of related performance metrics, and a second consolidated performance metric for the second aspect set may be calculated based on the second group of related performance metrics. The first consolidated performance metric may reflect a change in performance of the first aspect set over a time interval spanning from the first time to the second time, and the second consolidated performance metric may reflect a change in performance of the second aspect set over the time interval. For example, the first consolidated performance metric may reflect a change in stability of the first aspect set over the time interval and the second consolidated performance metric may reflect a change in stability of the second aspect set over the time interval.

In some embodiments, the first aspect set and/or the second aspect set may include a communication link, a protocol state relationship, a computer process, a routing process, a power status, and/or an environmental condition associated with one or more of the data processing elements. In some embodiments, the first and/or second plurality of performance metrics may be received in response to one or more polling requests. Additionally or alternatively, the first and/or second plurality of performance metrics may be transmitted or made available by the data processing elements at predefined regular intervals corresponding to the time interval.

In some embodiments, calculating the first consolidated performance metric may include multiplying the first group of related performance metrics by a first predefined weighting factor associated with the first aspect set, and calculating the second consolidated performance metric may include multiplying the second group of related performance metrics by a second predefined weighting factor associated with the second aspect set. The first predetermined weighting factor may reflect the significance of the first aspect set relative to one or more other aspect sets of the data processing elements and the second predetermined weighting factor may reflect the significance of the second aspect set relative to one or more other aspect sets of the data processing elements.

In some embodiments, the performance metric domain may include multiple performance centers. It may be determined that the first aspect set is associated with a first of the performance centers and that the second aspect set is associated with a second of the performance centers. A first performance center metric may be calculated for the first of the performance centers based at least in part on the first consolidated performance metric and a second performance center metric may be calculated for the second of the performance centers based at least in part on the second consolidated performance metric. The first performance center metric may reflect at least in part the change in performance of the first aspect set over a time interval and the second performance center metric may reflect at least in part the change in performance of the second aspect set over the time interval. In some embodiments, a performance center metric may be calculated for each of the performance centers and a consolidated performance metric may be calculated for the performance metric domain. Determining the consolidated performance metric for the performance metric domain may include summing each of the performance center metrics.

In some embodiments, a total number of the data processing elements associated with the first group of related performance metrics may be determined and a total number of the data processing elements associated with the second group of related performance metrics may be determined. Additionally or alternatively, a number of the total number of the plurality of data processing elements associated with the first group of related performance metrics for which a minimum threshold change has occurred over the time interval may be determined. A number of the total number of the plurality of data processing elements associated with the second group of related performance metrics for which a minimum threshold change has occurred over the time interval may be determined. In some embodiments, a first change impact factor for the first group of related performance metrics may be calculated and a second change impact factor for the second group of related performance metrics may be calculated. Calculating the first change impact factor may include determining a ratio of the total number of the data processing elements associated with the first group of performance metrics to the number of the total number of the data processing elements associated with the first group of related performance metrics for which the minimum threshold change has occurred over the time interval. Calculating the second change impact factor may include determining a ratio of the total number of the data processing elements associated with the second group of performance metrics to the number of the total number of the data processing elements associated with the second group of related performance metrics for which the minimum threshold change has occurred over the time interval. Calculating the first consolidated performance metric may include multiplying the first group of related performance metrics by the first change impact factor. Calculating the second consolidated performance metric may include multiplying the second group of related performance metrics by the second change impact factor.

In some embodiments, each performance metric of the first group of related performance metrics may be associated with a predetermined individual weighting factor that reflects the significance of the performance metric relative to one or more other performance metrics of the first group of related performance metrics. Each performance metric of the second group of related performance metrics may be associated with a predetermined individual weighting factor that reflects the significance of the performance metric relative to one or more other performance metrics of the second group of related performance metrics. Calculating or otherwise determining the first consolidated performance metric may include multiplying each performance metric of the first group of related performance metrics corresponding to a data processing element associated with the first group of related performance metrics for which the minimum threshold change has occurred over the time interval by its respective individual weighting factor. Calculating the second consolidated performance metric may include multiplying each performance metric of the second group of related performance metrics corresponding to a data processing element associated with the second group of related performance metrics for which the minimum threshold change has occurred over the time interval by its respective individual weighting factor.

In some embodiments, the performance metric domain may include multiple performance centers and the first and second groups of related performance metrics may be associated with a common performance center. A performance center metric corresponding to each of the performance centers may be calculated. For example, a performance center metric may be calculated for the common performance center associated with the first and second groups of related performance metrics. Calculating the performance center metric for the common performance center associated with the first and second groups may include summing the first consolidated performance metric and the second consolidated performance metric.

In some embodiments, a consolidated performance metric for the performance metric domain may be calculated. Calculating the consolidated performance metric for the performance metric domain may include summing each of the performance center metrics, including the performance center metric for the common performance center associated with the first and second groups.

In some embodiments, a portion of the performance centers may include one or more of the data processing elements associated with a centralized data processing center that supports one or more services of the performance metric domain. Additionally or alternatively, a portion of the performance centers may include one or more of the data processing elements associated with a network of a subscriber of the one or more services of the performance metric domain. In some embodiments, the first aspect set and/or the second aspect set may include one or more data processing elements selected based on their role in supporting the one or more services of the performance metric domain.

In some embodiments, a system may include a plurality of interconnected data processing elements associated with a performance metric domain. The system may include an apparatus comprising at least one processor and a memory, the memory storing instructions that when executed by the at least one processor cause the apparatus to: receive a first plurality of performance metrics from the plurality of interconnected data processing elements at a first time; receive a second plurality of performance metrics from the plurality of interconnected data processing elements at a second time, the second time being a time later than the first time; identify a first group of related performance metrics, the first group of related performance metrics comprising a portion of the first plurality of performance metrics that pertain to a first aspect set and a portion of the second plurality of performance metrics that pertain to the first aspect set; identify a second group of related performance metrics, the second group of related performance metrics comprising a portion of the first plurality of performance metrics that pertain to a second aspect set and a portion of the second plurality of performance metrics that pertain to the second aspect set; determine a first consolidated performance metric for the first aspect set based on the first group of related performance metrics, wherein the first consolidated performance metric reflects a change in stability of the first aspect set over a time interval substantially spanning from the first time to the second time; and determine a second consolidated performance metric for the second aspect set based on the second group of related performance metrics, wherein the second consolidated performance metric reflects a change in stability of the second aspect set over the time interval.

This summary is not intended to identify critical or essential features of the disclosure, but merely to summarize certain features and variations thereof. Other details and features will also be described in the sections that follow.

BRIEF DESCRIPTION OF THE DRAWINGS

Some features herein are illustrated by way of example, and not by way of limitation, in the figures of the accompanying drawings, in which like reference numerals refer to similar elements, and in which.

DETAILED DESCRIPTION

Figure 1:
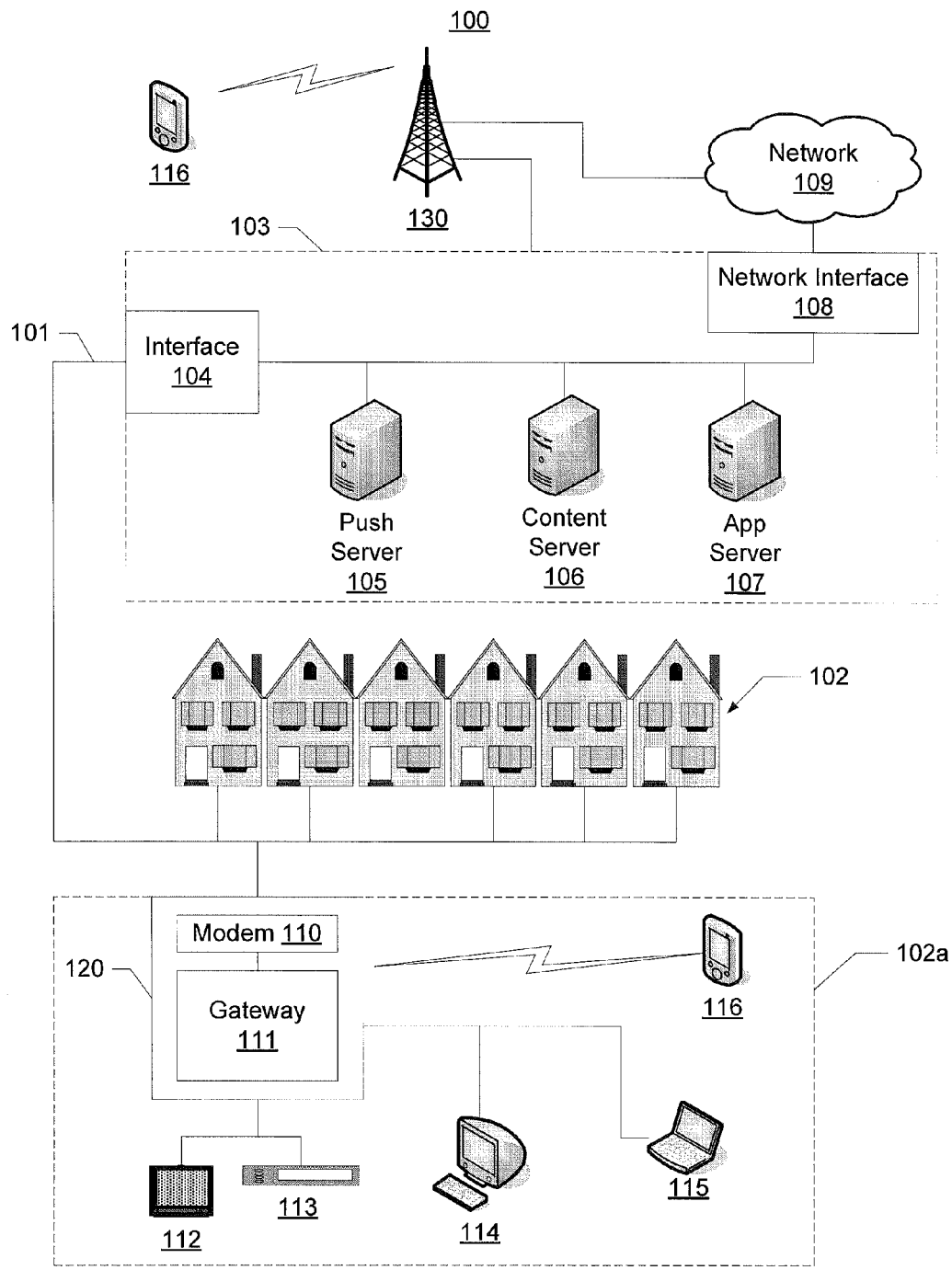
FIG. 1 depicts an illustrative network environment in which one or more aspects of the disclosure may be implemented.

FIG. 1 illustrates an example information distribution network 100 in which one or more of the various features described herein may be implemented. The illustrated information distribution network is only one example of a network and is not intended to suggest any limitation as to the scope of use or functionality of the disclosure. The illustrated network should not be interpreted as having any dependency or requirement relating to any component or combination of components in an information distribution network.

Network 100 may be a telecommunications network, a Multi-Service Operator (MSO) network, a cable television (CATV) network, a cellular network, a wireless network, an optical fiber network, a coaxial cable network, a Hybrid Fiber-Coaxial (HFC) network, or any other type of information distribution network or combination of networks. For example, network 100 may be a cellular broadband network communicating with multiple communications access points, such as wireless communications tower 130. In another example, network 100 may be a coaxial system comprising a Cable Modem Termination System (CMTS) communicating with numerous gateway interface devices (e.g., gateway interface device 111 in example home 102a). In another example, the network 100 may be a fiber-optic system comprising optical fibers extending from an Optical Line Terminal (OLT) to numerous Optical Network Terminals (ONTs) communicatively coupled with various gateway interface devices. In another example, the network 100 may be a Digital Subscriber Line (DSL) system that includes local office 103 communicating with numerous gateway interface devices. In another example, network 100 may be an HFC network in which Internet traffic is routed over both optical and coaxial communication paths to a gateway interface device in or near a user's home. Various aspects of the disclosure may operate on one or more of the networks described herein or any other network architectures now known or later developed.

Network 100 may use a series of interconnected communication links 101 (e.g., coaxial cables, optical fibers, wireless links, etc.) to connect premises such as homes 102 or other user environments to local office 103. Communication links 101 may include any wired communication links, wireless communication links, communications networks, or combinations thereof. For example, portions of communication links 101 may be implemented with fiber-optic cable, while other portions of communication links 101 may be implemented with coaxial cable. Communication links 101 may also include various communications components such as splitters, filters, amplifiers, wireless components, and other components for communicating data. Data may include, for example, Internet data, voice data, weather data, media content, and any other information. Media content may include, for example, video content, audio content, media on demand, video on demand, streaming video, television programs, text listings, graphics, advertisements, and other content. A media content item may represent an individual piece of media content, such as a particular movie, television episode, online video clip, song, audio recording, image, or any other data. In some instances, a media content item may be fragmented into segments, such as a plurality of two-second video fragments that may be separately addressed and retrieved.

Local office 103 may transmit downstream information signals onto communication links 101, and premises such as home 102 may receive and process those signals. In certain implementations, communication links 101 may originate from local office 103 as a single communications path, and may be split into any number of communication links to distribute data to homes 102 and various other destinations. Although the term home is used by way of example, homes 102 may include any type of user environment, such as single family homes, apartment complexes, businesses, schools, hospitals, parks, and other environments and combinations of environments.

Local office 103 may include interface 104, which may be a computing device configured to manage communications between devices on the network of communication links 101 and backend devices, such as server 105, server 106, and server 107. For example, interface 104 may be a terminal system such as CMTS. The termination system may be as specified in a standard, such as, in an example of an HFC-type network, the Data Over Cable Service Interface Specification (DOCSIS) standard, published by Cable Television Laboratories, Inc. The termination system may be configured to transmit data over one or more downstream channels or frequencies to be received by various devices, such as modems in homes 102, and to receive upstream communications from those modems on one or more upstream frequencies.

Local office 103 may include one or more network interfaces 108 for communicating with one or more external networks 109. One or more external networks 109 may include, for example, one or more telecommunications networks, Internet Protocol (IP) networks, cellular communications networks (e.g., Global System for Mobile Communications (GSM), Code Division Multiple Access (CDMA), and any other 2nd, 3rd, 4th, or higher generation cellular communications networks), cellular broadband networks, radio access networks, fiber-optic networks, local wireless networks (e.g., Wi-Fi, WiMAX), satellite networks, and any other networks or combinations of networks.

Local office 103 may include a variety of servers that may be configured to perform various functions. Local office 103 may include one or more push servers 105 for generating push notifications to deliver data, instructions, or both to devices that are configured to detect such notifications. Local office 103 may include one or more content servers 106 configured to provide content (e.g., media content) to devices. Local office 103 may include one or more application servers 107.

Homes 102 such as home 102a may include an interface 120, which may include device 110, for communicating on communication links 101 with local office 103, one or more external networks 109, or both. For example, device 110 may be a coaxial cable modem (for coaxial cable links 101), a broadband modem (for DSL links 101), a fiber interface node (for fiber-optic links 101), or any other device or combination of devices. In certain implementations, device 110 may be a part of, or communicatively coupled to, gateway interface device 111. Gateway interface device 111 may be, for example, a wireless router, a set-top box, a computer server, or any other computing device or combination.

Gateway interface device 111 may be any computing device for communicating with device 110 to allow one or more other devices in example home 102a to communicate with local office 103, one or more external networks 109, or other devices communicatively coupled thereto. Gateway interface device 111 may include local network interfaces to provide communication signals to client devices in or near example home 102a, such as television 112, set-top box 113, personal computer 114, laptop computer 115, wireless device 116 (e.g., a wireless laptop, a tablet computer, a mobile phone, a portable gaming device), vehicular computing system 117 (e.g., a mobile computing system, navigation system, or entertainment system in an automobile, marine vessel, or aircraft) and any other device.

Figure 2:
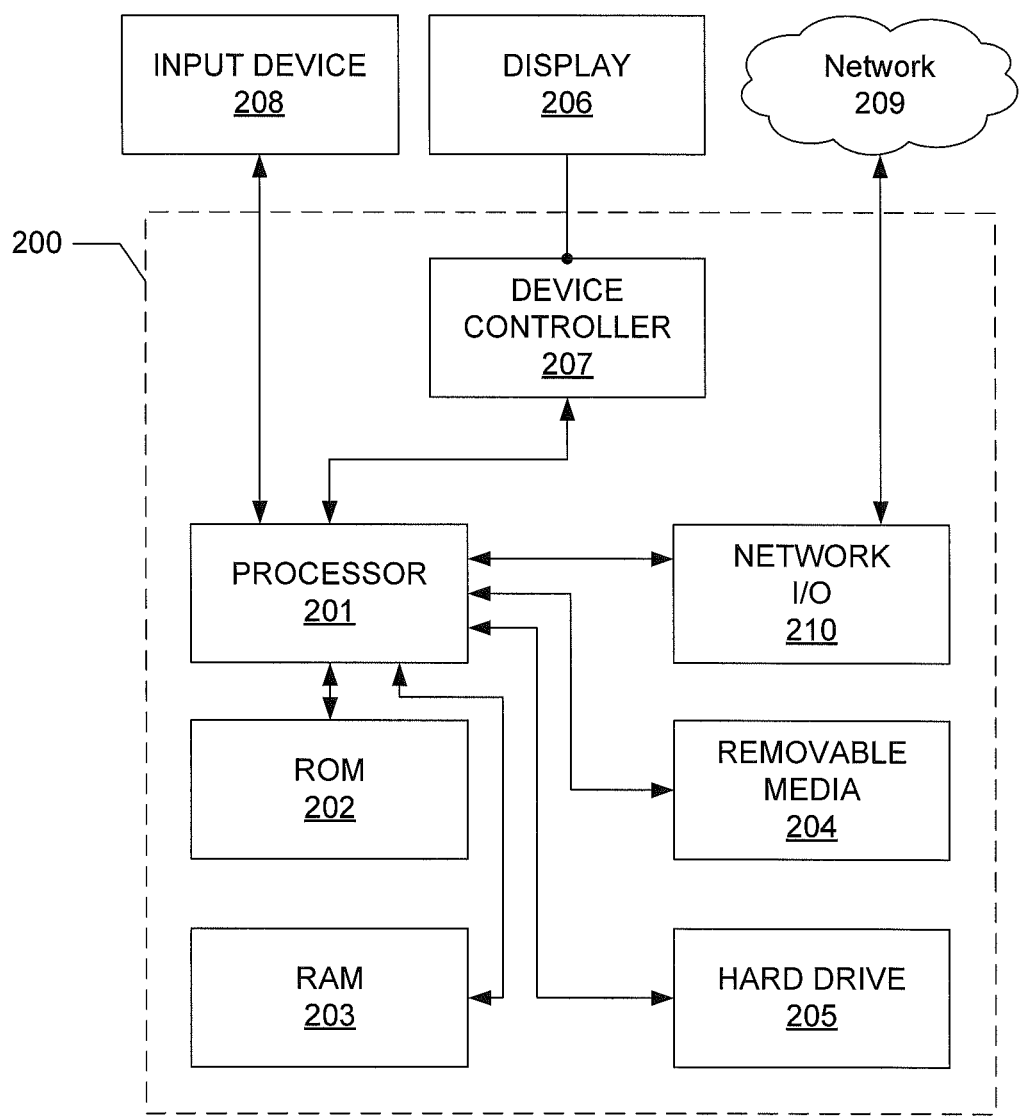
FIG. 2 depicts an illustrative software and hardware device on which various aspects of the disclosure may be implemented.

FIG. 2 illustrates general hardware elements and software elements that can be used to implement any of the various computing devices and/or software discussed herein. Device 200 may include one or more processors 201, which may execute instructions of a computer program to perform any of the functions and steps described herein. The instructions may be stored in any type of computer-readable medium or memory to configure the operation of the processor 201. For example, instructions may be stored in a Read-Only Memory (ROM) 202, Random Access Memory (RAM) 203, removable media 204, such as a Universal Serial Bus (USB) drive, Compact Disk (CD) or Digital Versatile Disk (DVD), hard drive, floppy disk drive, or any other desired electronic storage medium. Instructions may also be stored in hard drive 205, which may be an internal or external hard drive.

Device 200 may include one or more output devices, such as a display 206, such as an external monitor or television, and may include one or more output device controllers 207, such as a video processor. In some embodiments, device 200 may include one or more user input devices 208, such as a remote control, keyboard, mouse, touch screen, microphone, or any other input device.

Device 200 may also include one or more network interfaces, such as network Input/Output (I/O) interface 210 to communicate with an external network 209. The network interface may be a wired interface, wireless interface, or a combination of the two. In some embodiments, network I/O interface 210 may include a cable modem, and network 209 may include the communication links 101 shown in FIG. 1, one or more external networks 109, an in-home network, a provider's wireless, coaxial, fiber, or hybrid fiber/coaxial distribution system (e.g., a DOCSIS network), or any other desired network.

Figure 3:
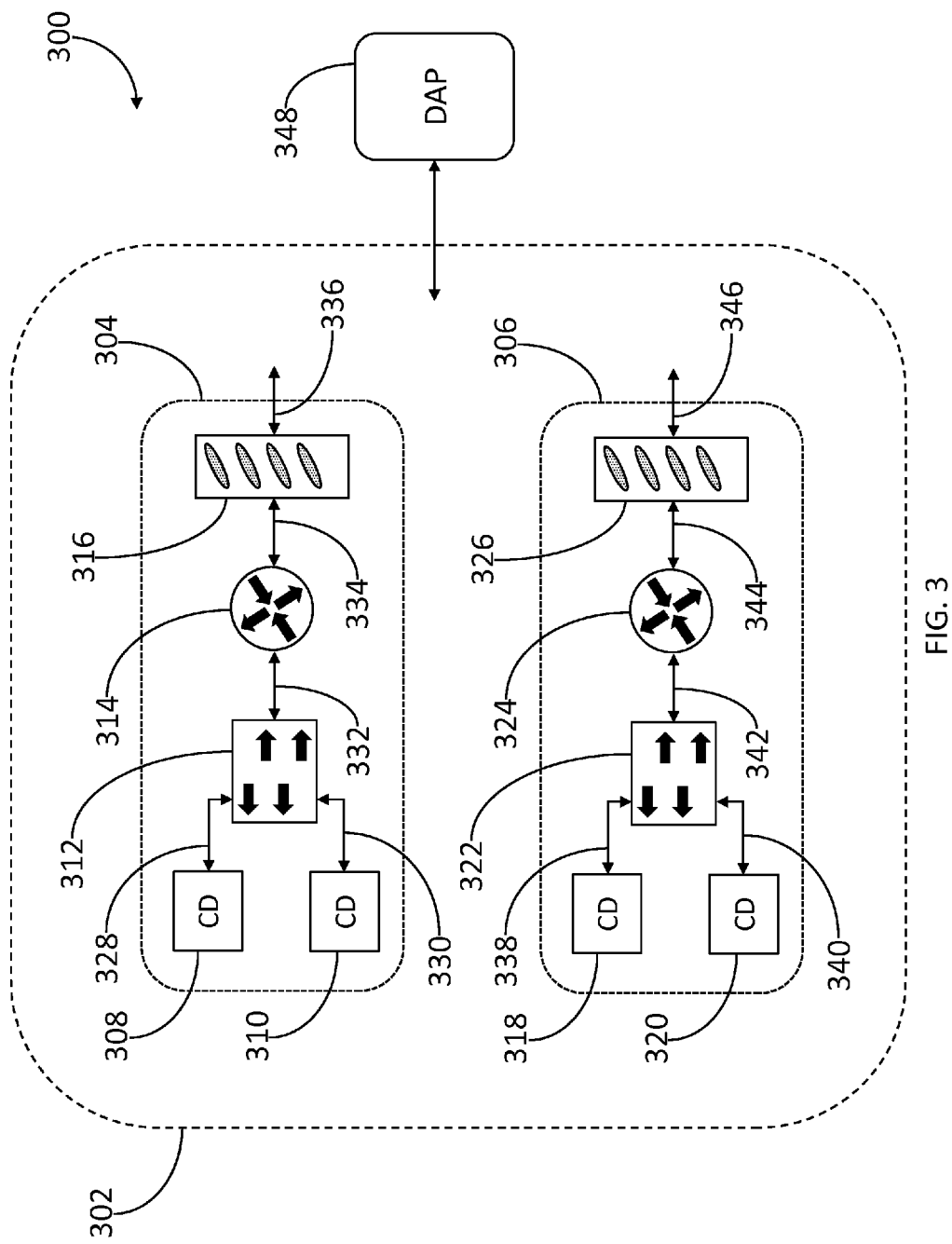
FIG. 3 depicts an illustrative network environment for employing systems and methods in accordance with one or more aspects of the disclosure.

FIG. 3 depicts an illustrative network environment for employing systems and methods in accordance with one or more aspects of the disclosure. Referring to FIG. 3, network environment 300 may comprise a performance metric domain. For example, network environment 300 may comprise performance metric domain 302. Performance metric domain 302 may include one or more performance centers. For example, performance metric domain 302 may include performance centers 304 and 306. Performance centers 304 and 306 may include one or more data processing elements. For example, performance center 304 may include data processing elements 308, 310, 312, 314, and 316. Similarly, performance center 306 may include data processing elements 318, 320, 322, 324, and 326.

In some embodiments, one or more performance centers of performance metric domain 302 may be associated with a centralized data processing center that supports one or more services of performance metric domain 302. For example, performance center 304 may be associated with a centralized data processing center, and data processing elements 308 and 310 may be computing devices (e.g., servers) that support one or more services of performance metric domain 302. Data processing element 312 may be a switch that interconnects data processing elements 308 and 310, and data processing element 314, via links 328, 330, and 332, respectively. Data processing element 314 may be a router and may connect and/or support communications between data processing element 312 and data processing element 316 via links 332 and 334, respectively. Data processing element 316 may be a gateway communication device (e.g., a CMTS) and may connect and/or support communications between data processing element 314 and network environment 300 via links 334 and 336, respectively. Similarly, performance center 306 may be associated with a centralized data processing center, and data processing elements 318 and 320 may be computing devices (e.g., servers) that support one or more services of performance metric domain 302. Data processing element 322 may be a switch that interconnects data processing elements 318 and 320, and data processing element 324, via links 338, 340, and 342, respectively. Data processing element 324 may be a router and may connect and/or support communications between data processing element 322 and data processing element 326 via links 342 and 344, respectively. Data processing element 326 may be a gateway communication device and may connect and/or support communications between data processing element 324 and network environment 300 via links 344 and 346, respectively.

In some embodiments, one or more performance centers of performance metric domain 302 may be associated with a network of a subscriber to one or more services of performance metric domain 302. For example, performance center 304 may be associated with a network of a subscriber to one or more services of performance metric domain 302, and data processing elements 308 and 310 may be computing devices (e.g., computers, wireless access points, set-top boxes) that utilize one or more services of performance metric domain 302. Data processing element 312 may be a switch that interconnects data processing elements 308 and 310, and data processing element 314, via links 328, 330, and 332, respectively. Data processing element 314 may be a router and may connect and/or support communications between data processing element 312 and data processing element 316 via links 332 and 334, respectively. Data processing element 316 may be a gateway communication device (e.g., a modem) and may connect and/or support communications between data processing element 314 and network environment 300 via links 334 and 336, respectively. Similarly, performance center 306 may be associated with a network of a subscriber to one or more services of performance metric domain 302, and data processing elements 318 and 320 may be computing devices (e.g., computers, wireless access points, set-top boxes) that utilize one or more services of performance metric domain 302. Data processing element 322 may be a switch that interconnects data processing elements 318 and 320, and data processing element 324, via links 338, 340, and 342, respectively. Data processing element 324 may be a router and may connect and/or support communications between data processing element 322 and data processing element 326 via links 342 and 344, respectively. Data processing element 326 may be a gateway communication device (e.g., a modem) and may connect and/or support communications between data processing element 324 and network environment 300 via links 344 and 346, respectively.

Network environment 300 may also include one or more data analysis platforms. For example, network environment 300 may include data analysis platform 348. Any of data processing elements 308, 310, 312, 314, 316, 318, 320, 322, 324, and 326 and/or data analysis platform 348 may include one or more hardware and/or software elements for implementing one or more of the functions described herein. For example, data processing elements 308, 310, 312, 314, 316, 318, 320, 322, 324, and 326 and/or data analysis platform 348 may include one or more of the hardware and/or software elements discussed above with respect to FIG. 2.

As will be described in greater detail below, data analysis platform 348 may be configured to receive multiple performance metrics from data processing elements 308, 310, 312, 314, 316, 318, 320, 322, 324, and/or 326. Data analysis platform 348 may be configured to calculate a consolidated performance metric for performance metric domain 302 based on the performance metrics received from data processing elements 308, 310, 312, 314, 316, 318, 320, 322, 324, and/or 326. Calculating the consolidated performance metric for performance metric domain 302 may include grouping the received performance metrics based on their respective associations with different aspects of data processing elements 308, 310, 312, 314, 316, 318, 320, 322, 324, and/or 326. Calculating the consolidated performance metric for performance metric domain 302 may include calculating multiple constituent consolidated performance metrics. Each of the constituent consolidated performance metrics may correspond to one or more of the performance metric groups. The consolidated performance metric for performance metric domain 302 may be calculated based on the calculated constituent consolidated performance metrics.

Figure 4A:
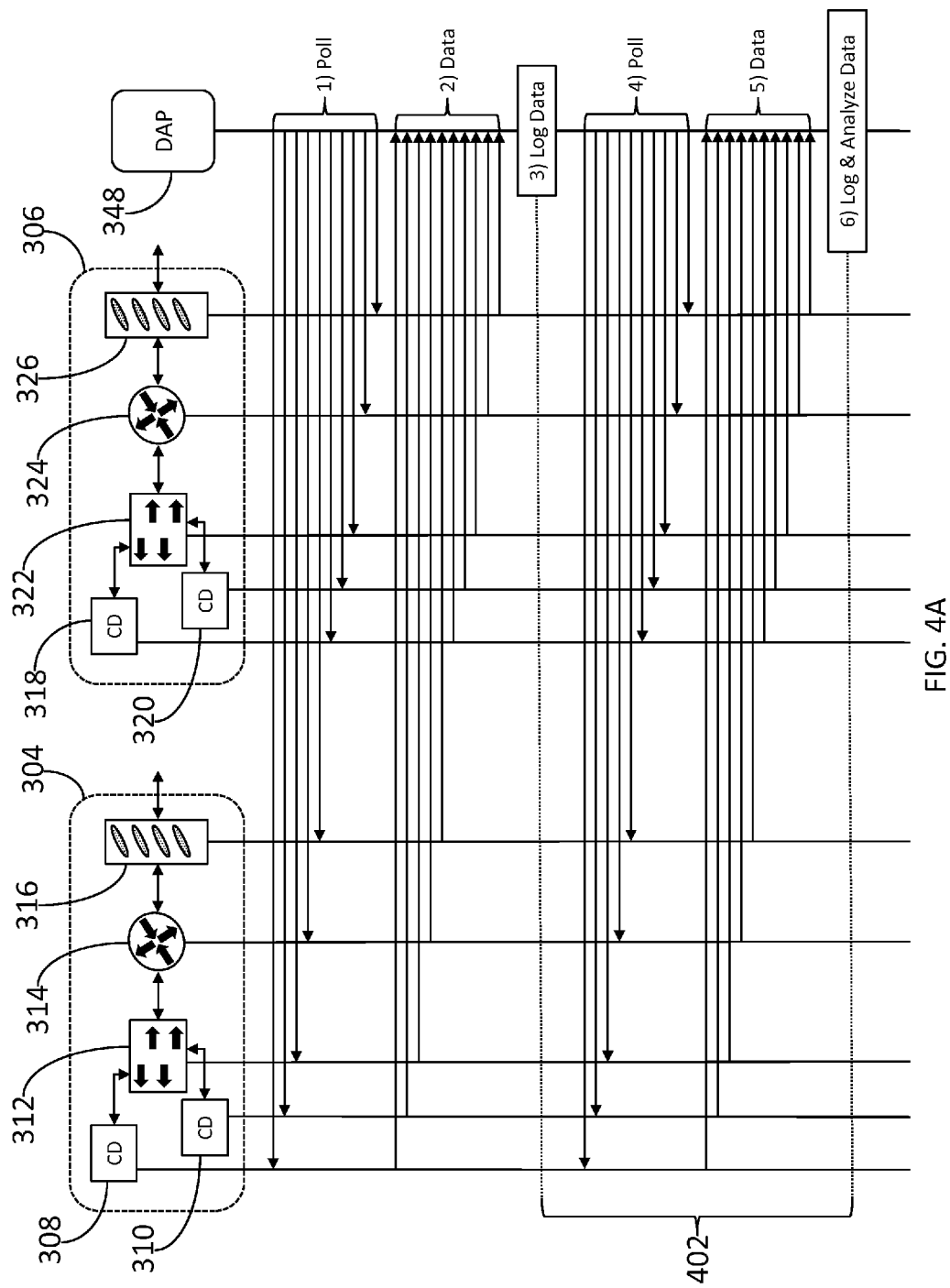
FIGS. 4A and 4B depict an illustrative sequence in accordance with one or more aspects of the disclosure.
Figure 4B:
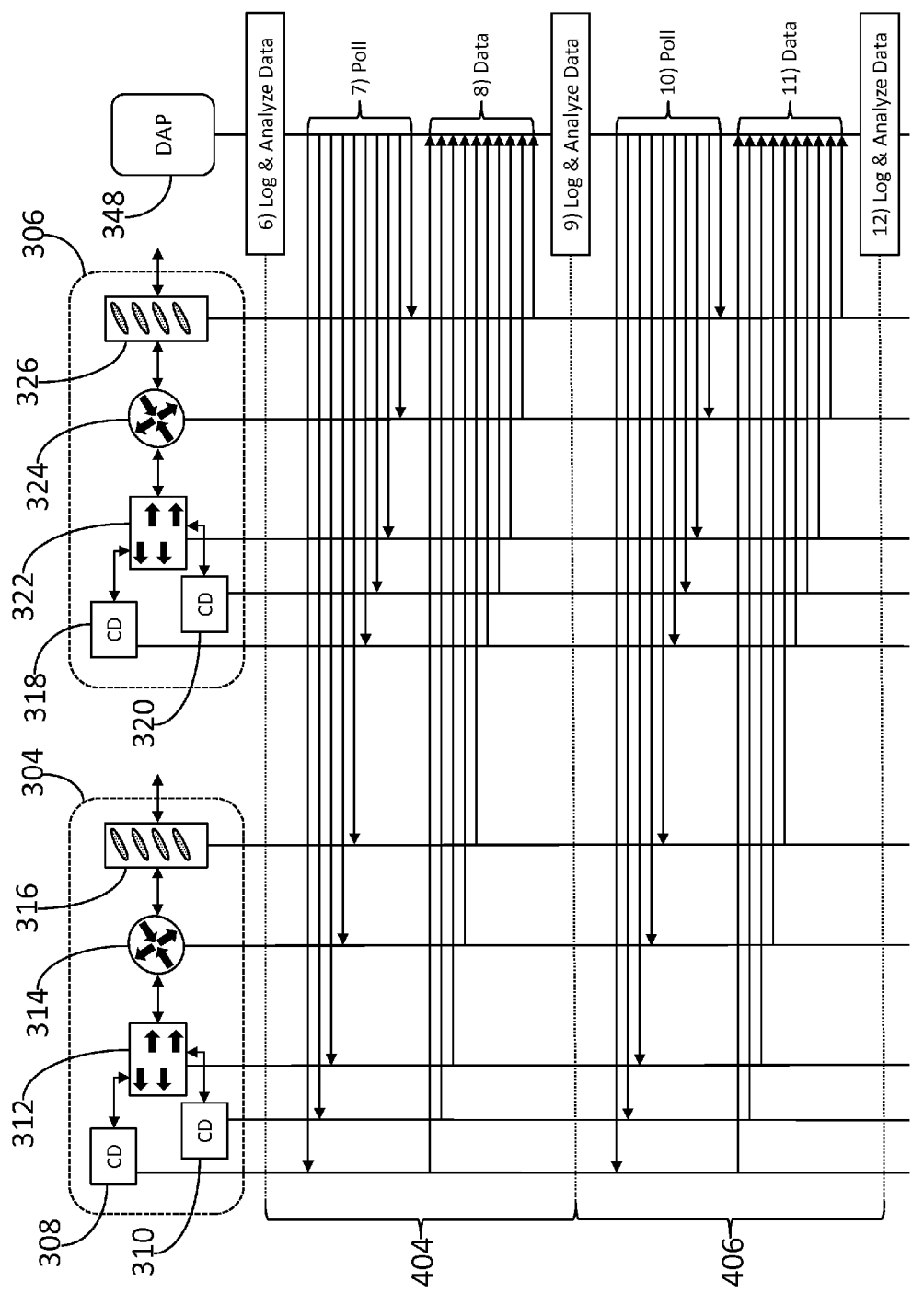

FIGS. 4A and 4B depict an illustrative sequence in accordance with one or more aspects of the disclosure. Referring to FIG. 4A, at 1, data analysis platform 348 may transmit one or more polling requests for one or more performance metrics to one or more of data processing elements 308, 310, 312, 314, 316, 318, 320, 322, 324, and/or 326. At 2, responsive to the polling request(s), one or more of data processing elements 308, 310, 312, 314, 316, 318, 320, 322, 324, and/or 326 may transmit one or more performance metrics to data analysis platform 348. Data analysis platform 348 may receive the performance metric(s) and, at 3, may log the performance metric(s). At 4, data analysis platform 348 may transmit one or more polling requests for one or more performance metrics to one or more of data processing elements 308, 310, 312, 314, 316, 318, 320, 322, 324, and/or 326. At 5, responsive to the polling request(s), one or more of data processing elements 308, 310, 312, 314, 316, 318, 320, 322, 324, and/or 326 may transmit one or more performance metrics to data analysis platform 348. Data analysis platform 348 may receive the performance metric(s) and, at 6, may log the performance metric(s). Data analysis platform 348 may perform analysis on the performance metric(s) received from data processing elements 308, 310, 312, 314, 316, 318, 320, 322, 324, and/or 326 in 2 and 5.

In some embodiments, data analysis platform 348 may be configured to identify one or more groups of related performance metrics that pertain to a particular predetermined aspect set. An aspect set may include one or more aspects of data processing elements 308, 310, 312, 314, 316, 318, 320, 322, 324, and/or 326. An aspect of a data processing element may be any facet of the data processing element that may affect its performance and/or stability. For example, an aspect of a data processing element may be a communication link, a protocol state relationship, a computer process, a routing process, a power measurement, or an environmental measurement associated with the data processing element. For example, data analysis platform 348 may identify one or more of the performance metric(s) received from data processing elements 308, 310, 312, 314, 316, 318, 320, 322, 324, and/or 326 in 2 and 5 (e.g., communication link utilization(s) received from data processing elements 308, 310, 312, 318, 320, and 322) as pertaining to a first aspect set (e.g., links 328, 330, 338, and 340). Similarly, data analysis platform 348 may identify one or more of the performance metric(s) received from data processing elements 308, 310, 312, 314, 316, 318, 320, 322, 324, and/or 326 in 2 and 5 (e.g., communication link utilization(s) received from data processing elements 312, 314, 316, 322, 324, and 326) as pertaining to a second aspect set (e.g., links 332, 334, 336, 342, 344, and 346). In some embodiments, an aspect set may be defined to include one or more aspects of data processing elements 308, 310, 312, 314, 316, 318, 320, 322, 324, and/or 326 based on their role in supporting one or more services of performance metric domain 302. For example, the first aspect set and/or the second aspect set may be defined to include one or more aspects of data processing elements 308, 310, 312, 314, 316, 318, 320, 322, 324, and/or 326 (e.g., links 328, 330, 332, 334, 336, 338, 340, 342, 344, and/or 346) based on their role in supporting one or more services (e.g., linear video content delivery, on-demand video content delivery, Voice over IP (VoIP), Internet web browsing support, etc.) of performance metric domain 302.

Data analysis platform 348 may be configured to utilize one or more of the performance metric(s) received from data processing elements 308, 310, 312, 314, 316, 318, 320, 322, 324, and/or 326 in 2 and 5 to calculate one or more consolidated performance metrics. For example, data analysis platform 348 may be configured to calculate a first consolidated performance metric for the first aspect set (e.g., links 328, 330, 338, and 340) based on the first group of related performance metrics (e.g., communication link utilization(s) received from data processing elements 308, 310, 312, 318, 320, and 322). Similarly, data analysis platform 348 may be configured to calculate a second consolidated performance metric for the second aspect set (e.g., links 332, 334, 336, 342, 344, and 346) based on the second group of related performance metrics (e.g., communication link utilization(s) received from data processing elements 312, 314, 316, 322, 324, and 326). The first and second consolidated performance metrics may respectively reflect a change in performance of the first aspect set and the second aspect set over a time interval. For example, the first and second consolidated performance metrics may respectively reflect a change in performance of the first aspect set (e.g., links 328, 330, 338, and 340) and the second aspect set (e.g., links 332, 334, 336, 342, 344, and 346) over time interval 402, which may substantially span from the time at which the performance metric(s) received from data processing elements 308, 310, 312, 314, 316, 318, 320, 322, 324, and/or 326 were received in 2 to the time at which the performance metric(s) received from data processing elements 308, 310, 312, 314, 316, 318, 320, 322, 324, and/or 326 were received in 5. In some embodiments, the first consolidated performance metric and/or the second consolidated performance metric may respectively reflect a change in stability (e.g., a change in the communication link utilization(s) received from data processing elements 308, 310, 312, 318, 320, and 322, and/or a change in the communication link utilization(s) received from data processing elements 312, 314, 316, 322, 324, and 326) of the first aspect set (e.g., links 328, 330, 338, and 340) and/or the second aspect set (e.g., links 332, 334, 336, 342, 344, and 346) over time interval 402.

One or more aspect sets may be associated with a predetermined weighting factor which may reflect its significance relative to one or more other aspect sets (e.g., its significance to performance and/or stability). For example, the first aspect set may be associated with a weighting factor that reflects its significance (e.g., the significance of links 328, 330, 338, and 340) relative to one or more other aspect sets (e.g., the second aspect set). Similarly, the second aspect set may be associated with a weighting factor that reflects its significance (e.g., the significance of links 332, 334, 336, 342, 344, and 346) relative to one or more other aspect sets (e.g., the first aspect set). Calculating the first consolidated performance metric may include multiplying the first group of related performance metrics by the weighting factor associated with the first aspect set. Similarly, calculating the second consolidated performance metric may include multiplying the second group of related performance metrics by the weighting factor associated with the second aspect set.

In some embodiments, data analysis platform 348 may be configured to determine a total number of data processing elements 308, 310, 312, 314, 316, 318, 320, 322, 324, and 326 associated with the first group of performance metrics and/or a total number of data processing elements 308, 310, 312, 314, 316, 318, 320, 322, 324, and 326 associated with the second group of performance metrics. For example, data analysis platform 348 may determine that six (6) of data processing elements 308, 310, 312, 314, 316, 318, 320, 322, 324, and 326 are associated with the first group of performance metrics (e.g., data processing elements 308, 310, 312, 318, 320, and 322). Similarly, data analysis platform 348 may determine that six (6) of data processing elements 308, 310, 312, 314, 316, 318, 320, 322, 324, and 326 are associated with the second group of performance metrics (e.g., data processing elements 312, 314, 316, 322, 324, and 326).

Additionally or alternatively, data analysis platform 348 may determine a number of the total number of data processing elements 308, 310, 312, 314, 316, 318, 320, 322, 324, and 326 associated with the first group and/or second group of performance metrics for which a minimum threshold change has occurred over time interval 402. For example, data analysis platform 348 may be configured to regard any change in the first and/or second group of performance metrics over time interval 402 that is less than ten percent (10%) to be of a magnitude insufficient to be taken into account on par with one or more other of the first and/or second group of performance metrics (e.g., one or more of the first and/or second group of performance metrics that changed ten percent (10%) or more over time interval 402) in the calculation of one or more consolidated performance metrics, data analysis platform 348 may determine that three (3) of data processing elements 308, 310, 312, 314, 316, 318, 320, 322, 324, and 326 associated with the first group of performance metrics had performance metrics that changed less than ten percent (10%) over time interval 402 (e.g., data processing elements 308, 310, and 312), that three (3) of data processing elements 308, 310, 312, 314, 316, 318, 320, 322, 324, and 326 associated with the first group of performance metrics had performance metrics that changed ten percent (10%) or more over time interval 402 (e.g., data processing elements 318, 320, and 322), that three (3) of data processing elements 308, 310, 312, 314, 316, 318, 320, 322, 324, and 326 associated with the second group of performance metrics had performance metrics that changed less than ten percent (10%) over time interval 402 (e.g., data processing elements 312, 314, and 316), and that three (3) of data processing elements 308, 310, 312, 314, 316, 318, 320, 322, 324, and 326 associated with the second group of performance metrics had performance metrics that changed ten percent (10%) or more over time interval 402 (e.g., data processing elements 322, 324, and 326).

Data analysis platform 348 may be configured to calculate a first change impact factor for the first group of related performance metrics and/or a second change impact factor for the second group of related performance metrics. Data analysis platform 348 may be configured to calculate the first change impact factor by determining a ratio of the total number of data processing elements 308, 310, 312, 314, 316, 318, 320, 322, 324, and 326 associated with the first group of performance metrics (e.g., 6) to the number of the total number of data processing elements 308, 310, 312, 314, 316, 318, 320, 322, 324, and 326 associated with the first group of performance metrics for which the minimum threshold change occurred over time interval 402 (e.g., 3). Similarly, data analysis platform 348 may be configured to calculate the second change impact factor by determining a ratio of the total number of data processing elements 308, 310, 312, 314, 316, 318, 320, 322, 324, and 326 associated with the second group of performance metrics (e.g., 6) to the number of the total number of data processing elements 308, 310, 312, 314, 316, 318, 320, 322, 324, and 326 associated with the second group of performance metrics for which the minimum threshold change occurred over time interval 402 (e.g., 3). In some embodiments, data analysis platform 348 may be configured to calculate the first change impact factor by multiplying the first group of related performance metrics by the first change impact factor. Similarly, data analysis platform 348 may be configured to calculate the second change impact factor by multiplying the second group of related performance metrics by the second change impact factor.

In some embodiments, each performance metric of the first and second groups of related performance metrics may be associated with a predetermined individual weighting factor that reflects the significance of the performance metric relative to one or more other performance metrics of the first or second group of related performance metrics, respectively. For example, links 338 and 340 may be considered less significant relative to link 342, and performance metrics received from data processing element 322 that pertain to links 338 or 340 may be associated with a predetermined individual weighting factor that reflects their relative importance to performance metrics received from data processing element 322 that pertain to link 342, while performance metrics received from data processing element 322 that pertain to link 342 may be associated with a predetermined individual weighting factor that reflects their relative importance to performance metrics received from data processing element 322 that pertain to links 338 or 340. Similarly, link 344 may be considered less significant relative to link 346, and performance metrics received from data processing element 326 that pertain to link 344 may be associated with a predetermined individual weighting factor that reflects their relative importance to performance metrics received from data processing element 326 that pertain to link 346, while performance metrics received from data processing element 326 that pertain to link 346 may be associated with a predetermined individual weighting factor that reflects their relative importance to performance metrics received from data processing element 326 that pertain to link 344.

In some embodiments, data analysis platform 348 may be configured to calculate the first consolidated performance metric by multiplying each performance metric of the first group of related performance metrics for which the minimum threshold change has occurred over time interval 402 by its respective individual weighting factor, and/or to calculate the second consolidated performance metric by multiplying each performance metric of the second group of related performance metrics for which the minimum threshold change has occurred over time interval 402 by its respective individual weighting factor. For example, data analysis platform 348 may be configured to calculate the first consolidated performance metric by multiplying each performance metric of the first group of related performance metrics received from data processing element 322 that pertains to link 338 or 340 by its respective individual weighting factor and multiply each performance metric of the first group of related performance metrics received from data processing element 322 that pertains to link 342 by its respective individual weighting factor. Similarly, data analysis platform 348 may be configured to calculate the second consolidated performance metric by multiplying each performance metric of the second group of related performance metrics received from data processing element 326 that pertains to link 344 by its respective individual weighting factor and multiply each performance metric of the second group of related performance metrics received from data processing element 326 that pertains to link 346 by its respective individual weighting factor.

Referring to FIG. 4B, at 7, data analysis platform 348 may transmit one or more polling requests for one or more performance metrics to one or more of data processing elements 308, 310, 312, 314, 316, 318, 320, 322, 324, and/or 326. At 8, responsive to the polling request(s), one or more of data processing elements 308, 310, 312, 314, 316, 318, 320, 322, 324, and/or 326 may transmit one or more performance metrics to data analysis platform 348. Data analysis platform 348 may receive the performance metric(s) and, at 9, may log the performance metric(s). Data analysis platform 348 may perform analysis on the performance metric(s) received from data processing elements 308, 310, 312, 314, 316, 318, 320, 322, 324, and/or 326 in 2, 5, and/or 8.

In some embodiments, data analysis platform 348 may be configured to identify one or more groups of related performance metrics that pertain to a particular predetermined aspect set. For example, data analysis platform 348 may identify one or more of the performance metric(s) received from data processing elements 308, 310, 312, 314, 316, 318, 320, 322, 324, and/or 326 in 2, 5, and/or 8 (e.g., communication link utilization(s) received from data processing element 314) as pertaining to a first aspect set (e.g., links 332 and 334). Similarly, data analysis platform 348 may identify one or more of the performance metric(s) received from data processing elements 308, 310, 312, 314, 316, 318, 320, 322, 324, and/or 326 in 2, 5, and/or 8 (e.g., communication link utilization(s) received from data processing element 324) as pertaining to a second aspect set (e.g., links 342 and 344).

As described above, data analysis platform 348 may be configured to utilize one or more of the performance metric(s) received from data processing elements 308, 310, 312, 314, 316, 318, 320, 322, 324, and/or 326 in 2, 5, and/or 8 to calculate one or more consolidated performance metrics. For example, data analysis platform 348 may be configured to calculate a first consolidated performance metric for the first aspect set (e.g., links 332 and 334) based on the first group of related performance metrics (e.g., communication link utilization(s) received from data processing element 314). Similarly, data analysis platform 348 may be configured to calculate a second consolidated performance metric for the second aspect set (e.g., links 342 and 344) based on the second group of related performance metrics (e.g., communication link utilization(s) received from data processing element 324). The first and second consolidated performance metrics may respectively reflect a change in performance of the first aspect set and the second aspect set over a time interval. For example, the first and second consolidated performance metrics may respectively reflect a change in performance of the first aspect set (e.g., links 332 and 334) and the second aspect set (e.g., links 342 and 344) over time interval 404, which may substantially span from the time at which the performance metric(s) received from data processing elements 308, 310, 312, 314, 316, 318, 320, 322, 324, and/or 326 were received in 5 to the time at which the performance metric(s) received from data processing elements 308, 310, 312, 314, 316, 318, 320, 322, 324, and/or 326 were received in 8.

In some embodiments, data analysis platform 348 may be configured to determine that the first and second aspect sets are respectively associated with one or more different performance centers of performance metric domain 302. For example, data analysis platform 348 may determine that the first aspect set (e.g., links 332 and 334) is associated with performance center 304 and/or that the second aspect set (e.g., links 342 and 344) is associated with performance center 306. In some embodiments, data analysis platform 348 may be configured to calculate a performance center metric for one or more of the different performance centers of performance metric domain 302. For example, data analysis platform 348 may calculate a performance center metric for performance centers 304 and/or 306. In some embodiments, data analysis platform 348 may be configured to calculate a performance center metric for performance center 304 based at least in part on the first consolidated performance metric. Similarly, data analysis platform 348 may be configured to calculate a performance center metric for performance center 306 based at least in part on the second consolidated performance metric. The performance center metric for performance center 304 may reflect at least in part the change in performance of the first aspect set (e.g., links 332 and 334) over time interval 404. Similarly, the performance center metric for performance center 306 may reflect at least in part the change in performance of the second aspect set (e.g., links 342 and 344) over time interval 404.

In some embodiments, data analysis platform 348 may be configured to calculate a consolidated performance metric for performance metric domain 302. Data analysis platform 348 may be configured to calculate the consolidated performance metric for performance metric domain 302 by summing a performance center metric of each performance center associated with performance metric domain 302. For example, data analysis platform 348 may calculate a consolidated performance metric for performance metric domain 302 by summing the performance center metrics for performance centers 304 and 306.

At 10, data analysis platform 348 may transmit one or more polling requests for one or more performance metrics to one or more of data processing elements 308, 310, 312, 314, 316, 318, 320, 322, 324, and/or 326. At 11, responsive to the polling request(s), one or more of data processing elements 308, 310, 312, 314, 316, 318, 320, 322, 324, and/or 326 may transmit one or more performance metrics to data analysis platform 348. Data analysis platform 348 may receive the performance metric(s) and, at 12, may log the performance metric(s). Data analysis platform 348 may perform analysis on the performance metric(s) received from data processing elements 308, 310, 312, 314, 316, 318, 320, 322, 324, and/or 326 in 2, 5, 8, and/or 11.

As described above, in some embodiments, data analysis platform 348 may be configured to identify one or more groups of related performance metrics that pertain to a particular predetermined aspect set. For example, data analysis platform 348 may identify one or more of the performance metric(s) received from data processing elements 308, 310, 312, 314, 316, 318, 320, 322, 324, and/or 326 in 2, 5, 8, and/or 11 (e.g., communication link utilization(s) received from data processing element 312) as pertaining to a first aspect set (e.g., links 328 and 330). Similarly, data analysis platform 348 may identify one or more of the performance metric(s) received from data processing elements 308, 310, 312, 314, 316, 318, 320, 322, 324, and/or 326 in 2, 5, 8, and/or 11 (e.g., communication link utilization(s) received from data processing element 316) as pertaining to a second aspect set (e.g., links 334 and 336).

Data analysis platform 348 may be configured to utilize one or more of the performance metric(s) received from data processing elements 308, 310, 312, 314, 316, 318, 320, 322, 324, and/or 326 in 2, 5, 8, and/or 11 to calculate one or more consolidated performance metrics. For example, data analysis platform 348 may be configured to calculate a first consolidated performance metric for the first aspect set (e.g., links 328 and 330) based on the first group of related performance metrics (e.g., communication link utilization(s) received from data processing element 312). Similarly, data analysis platform 348 may be configured to calculate a second consolidated performance metric for the second aspect set (e.g., links 334 and 336) based on the second group of related performance metrics (e.g., communication link utilization(s) received from data processing element 316). The first and second consolidated performance metrics may respectively reflect a change in performance of the first aspect set and the second aspect set over a time interval. For example, the first and second consolidated performance metrics may respectively reflect a change in performance of the first aspect set (e.g., links 328 and 330) and the second aspect set (e.g., links 334 and 336) over time interval 406, which may substantially span from the time at which the performance metric(s) received from data processing elements 308, 310, 312, 314, 316, 318, 320, 322, 324, and/or 326 were received in 8 to the time at which the performance metric(s) received from data processing elements 308, 310, 312, 314, 316, 318, 320, 322, 324, and/or 326 were received in 11.

In some embodiments, data analysis platform 348 may be configured to determine that the first and second aspect sets are both associated with one or more common performance centers of performance metric domain 302. For example, data analysis platform 348 may determine that the first aspect set (e.g., links 328 and 330) is associated with performance center 304 and that the second aspect set (e.g., links 334 and 336) is also associated with performance center 304. In some embodiments, data analysis platform 348 may be configured to calculate a performance center metric for one or more of the performance centers of performance metric domain 302. For example, data analysis platform 348 may calculate a performance center metric for performance center 304. In some embodiments, data analysis platform 348 may be configured to calculate a performance center metric for performance center 304 based at least in part on the first and second consolidated performance metrics. The performance center metric for performance center 304 may reflect at least in part the change in performance of the first aspect set (e.g., links 328 and 330) and the second aspect set (e.g., links 334 and 336) over time interval 406. In some embodiments, data analysis platform 348 may calculate the performance center metric for performance center 304 by summing the first and second consolidated performance metrics.

The performance metrics received from data processing elements 308, 310, 312, 314, 316, 318, 320, 322, 324, and 326 in 2, 5, 8, and 11 are merely illustrative. For example, in some embodiments, polling one or more of data processing elements 308, 310, 312, 314, 316, 318, 320, 322, 324, and 326 may not be performed. For example, one or more of data processing elements 308, 310, 312, 314, 316, 318, 320, 322, 324, and 326 may be configured to transmit performance metrics (e.g., to data analysis platform 348) at one or more predefined regular intervals (e.g., one or more intervals corresponding to time intervals 402, 404, and/or 406).

Figure 5:
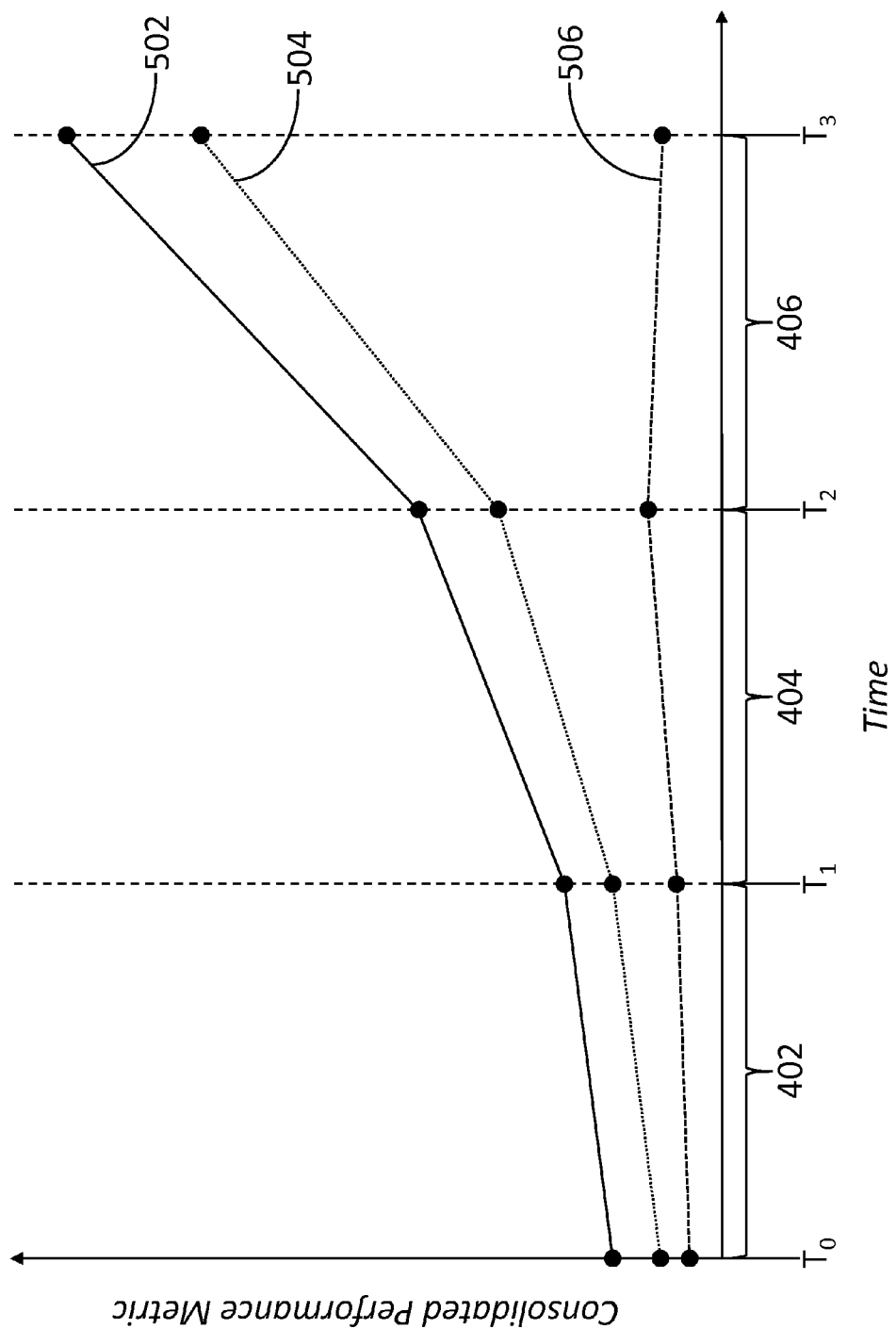
FIG. 5 depicts an illustration of consolidated performance metrics in accordance with one or more aspects of the disclosure.

FIG. 5 depicts an illustration of consolidated performance metrics in accordance with one or more aspects of the disclosure. Referring to FIG. 5, line 502 may represent consolidated performance metric measurements for performance metric domain 302 over a time period substantially spanning from the time at which the performance metric(s) received from data processing elements 308, 310, 312, 314, 316, 318, 320, 322, 324, and/or 326 are received in 2 (FIG. 4A) to the time at which the performance metric(s) received from data processing elements 308, 310, 312, 314, 316, 318, 320, 322, 324, and/or 326 are received in 11 (FIG. 4B). Line 502 may be plotted using data points that correspond to consolidated performance metric measurements for performance metric domain 302 for each of time intervals 402, 404, and 406. As illustrated, line 502 may indicate that the consolidated performance metric measurements for performance metric domain 302 have increased over each of time intervals 402, 404, and 406, which may, for example, indicate instability of performance metric domain 302.

Line 504 may represent consolidated performance metric measurements for performance center 304 over a time period substantially spanning from the time at which the performance metric(s) received from data processing elements 308, 310, 312, 314, 316, 318, 320, 322, 324, and/or 326 are received in 2 (FIG. 4A) to the time at which the performance metric(s) received from data processing elements 308, 310, 312, 314, 316, 318, 320, 322, 324, and/or 326 are received in 11 (FIG. 4B). Line 504 may be plotted using data points that correspond to consolidated performance metric measurements for performance center 304 for each of time intervals 402, 404, and 406. As illustrated, line 504 may indicate that the consolidated performance metric measurements for performance center 304 have increased over each of time intervals 402, 404, and 406, which may, for example, indicate instability of performance center 304.

Line 506 may represent consolidated performance metric measurements for performance center 306 over a time period substantially spanning from the time at which the performance metric(s) received from data processing elements 308, 310, 312, 314, 316, 318, 320, 322, 324, and/or 326 are received in 2 (FIG. 4A) to the time at which the performance metric(s) received from data processing elements 308, 310, 312, 314, 316, 318, 320, 322, 324, and/or 326 are received in 11 (FIG. 4B). Line 506 may be plotted using data points that correspond to consolidated performance metric measurements for performance center 306 for each of time intervals 402, 404, and 406. As illustrated, line 506 may indicate that the consolidated performance metric measurements for performance center 306 have increased slightly over each of time intervals 402 and 404, and decreased slightly over time interval 406, which may, for example, indicate stability of performance center 306 relative to performance center 304 and/or performance metric domain 302.

As described above, one or more consolidated performance metrics for performance metric domain 302 may be calculated by summing one or more constituent consolidated performance metrics of performance metric domain 302 (e.g., one or more consolidated performance metrics for performance center 304 and/or 306). As the illustration in FIG. 5 depicts, the consolidation of one or more constituent performance metrics into one or more consolidated performance metrics (e.g., the consolidation of one or more performance metrics for performance center 304 and/or 306 into one or more consolidated performance metrics for performance metric domain 302) may aid in identifying one or more trends and/or underlying causes of such trends for performance metric domain 302. For example, as the illustrative plot of FIG. 5 depicts, line 502 may indicate that the consolidated performance metric measurements for performance metric domain 302 have increased over each of time intervals 402, 404, and 406, which may, for example, indicate instability of performance metric domain 302. As the illustration in FIG. 5 depicts, the underlying cause of the depicted instability of performance metric domain 302 may be associated with performance center 304 (e.g., line 504 (or one or more trends represented by line 504) may indicate that the consolidated performance metric measurements for performance center 304 have increased over each of time intervals 402, 404, and 406, which may, for example, indicate instability of performance center 304, and line 506 (or one or more trends represented by line 506) may indicate that the consolidated performance metric measurements for performance center 306 have increased slightly over each of time intervals 402 and 404, and decreased slightly over time interval 406, which may, for example, indicate stability of performance center 306 relative to performance center 304 and/or performance metric domain 302). Moreover, underlying the data points on which each of lines 504 and 506 are based may be one or more constituent consolidated performance metrics respectively associated with performance centers 304 and 306 (e.g., consolidated performance metric(s) that reflect a change in one or more aspect sets respectively associated with performance centers 304 and 306), the trends of which may shed further light on the underlying cause of the trends of lines 504 and/or 506.

Figure 6:
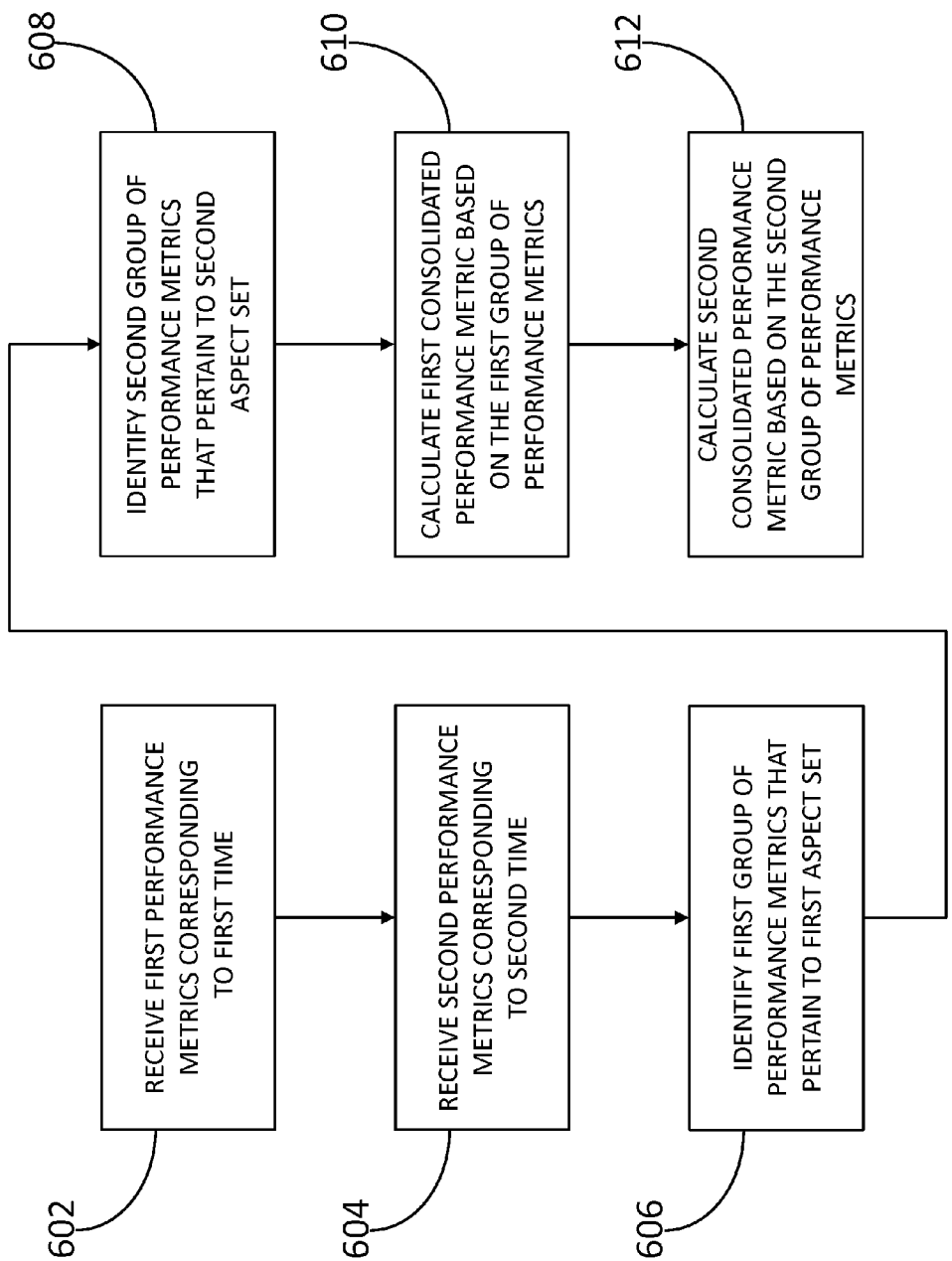
FIG. 6 depicts an illustrative method in accordance with one or more aspects of the disclosure.

FIG. 6 depicts an illustrative method in accordance with one or more aspects of the disclosure. Referring to FIG. 6, at step 602, a first plurality of performance metrics corresponding to a first time may be received. For example, data analysis platform 348 may receive performance metrics from one or more of data processing elements 308, 310, 312, 314, 316, 318, 320, 322, 324, and/or 326 at a time substantially corresponding to 2 (FIG. 4A). At step 604, a second plurality of performance metrics corresponding to a second time may be received. For example, data analysis platform 348 may receive performance metrics from one or more of data processing elements 308, 310, 312, 314, 316, 318, 320, 322, 324, and/or 326 at a time substantially corresponding to 5 (FIG. 4A). At step 606, a first group of performance metrics that pertain to a first aspect set may be identified. For example, data analysis platform 348 may identify one or more of the performance metrics received from data processing elements 308, 310, 312, 314, 316, 318, 320, 322, 324, and/or 326 in 2 and 5 (FIG. 4A) (e.g., communication link utilization(s) received from data processing elements 308, 310, 312, 318, 320, and 322) as pertaining to a first aspect set (e.g., links 328, 330, 338, and 340). At step 608, a second group of performance metrics that pertain to a second aspect set may be identified. For example, data analysis platform 348 may identify one or more of the performance metrics received from data processing elements 308, 310, 312, 314, 316, 318, 320, 322, 324, and/or 326 in 2 and 5 (FIG. 4A) (e.g., communication link utilization(s) received from data processing elements 312, 314, 316, 322, 324, and 326) as pertaining to a second aspect set (e.g., links 332, 334, 336, 342, 344, and 346). At step 610, a first consolidated performance metric may be calculated based on the first group of performance metrics. For example, data analysis platform 348 may calculate a first consolidated performance metric for the first aspect set (e.g., links 328, 330, 338, and 340) based on the first group of related performance metrics (e.g., communication link utilization(s) received from data processing elements 308, 310, 312, 318, 320, and 322). At step 612, a second consolidated performance metric may be calculated based on the second group of performance metrics. For example, data analysis platform 348 may calculate a second consolidated performance metric for the second aspect set (e.g., links 332, 334, 336, 342, 344, and 346) based on the second group of related performance metrics (e.g., communication link utilization(s) received from data processing elements 312, 314, 316, 322, 324, and 326).

The methods and features recited herein may be implemented through any number of computer readable media that are able to store computer readable instructions. Examples of computer readable media that may be used include RAM, ROM, Electrically Erasable Programmable Read-Only Memory (EEPROM), flash memory or other memory technology, CD-ROM, DVD, or other optical disk storage, magnetic cassettes, magnetic tape, magnetic storage, and the like.

Additionally or alternatively, in at least some embodiments, the methods and features recited herein may be implemented through one or more Integrated Circuits (ICs). An IC may, for example, be a microprocessor that accesses programming instructions or other data stored in a ROM. In some embodiments, a ROM may store program instructions that cause an IC to perform operations according to one or more of the methods described herein. In some embodiments, one or more of the methods described herein may be hardwired into an IC. For example, an IC may comprise an Application Specific Integrated Circuit (ASIC) having gates and/or other logic dedicated to the calculations and other operations described herein. In still other embodiments, an IC may perform some operations based on execution of programming instructions read from ROM or RAM, with other operations hardwired into gates or other logic. Further, an IC may be configured to output image data to a display buffer.

Although specific examples of carrying out the disclosure have been described, those skilled in the art will appreciate that there are numerous variations and permutations of the above-described apparatuses and methods that are contained within the spirit and scope of the disclosure as set forth in the appended claims. Additionally, numerous other embodiments, modifications, and variations within the scope and spirit of the appended claims may occur to persons of ordinary skill in the art from a review of this disclosure. Specifically, any of the features described herein may be combined with any or all of the other features described herein.

The various features described above are merely nonlimiting examples, and can be rearranged, combined, subdivided, omitted, and/or altered in any desired manner. For example, features of the servers can be subdivided among multiple processors and computing devices. The true scope of this patent should only be defined by the claims that follow.

What is claimed is:

1. A method, comprising:
transmitting polling requests to a plurality of data processing devices associated with a performance metric domain;

receiving, in response to the polling requests, a plurality of performance metrics from the plurality of data processing devices;
grouping the plurality of performance metrics into a plurality of performance metric groups based on their respective associations with the plurality of data processing devices;
determining, based on the plurality of performance metrics, a plurality of constituent consolidated performance metrics, each of the plurality of constituent consolidated performance metrics corresponding to at least one of the plurality of performance metric groups;
determining, based on the plurality of constituent consolidated performance metrics, a consolidated performance metric for the performance metric domain; and
outputting for display a graph comprising the consolidated performance metric for the performance metric domain.

2. The method of claim 1, wherein a performance metric group of the plurality of performance metric groups is associated with one of linear video content delivery, on-demand video content delivery, voice over IP, or internet web browsing support.

3. The method of claim 1, wherein the plurality of data processing devices comprise servers, switches, routers, and gateway communication devices.

4. The method of claim 1, wherein grouping the plurality of performance metrics comprises grouping the plurality of performance metrics based at least in part on their association with a communication link of the data processing devices, a protocol state relationship associated with the data processing devices, a computer process performed by the data processing devices, a routing process performed by the data processing devices, a power status of the data processing devices, or an environmental condition associated with the data processing devices.

5. The method of claim 1, further comprising:
determining a first number of the plurality of data processing devices associated with a group of the plurality of performance metric groups; and
determining a second number of data processing devices associated with the group of the plurality of performance metric groups for which a minimum threshold change has occurred over a time interval.

6. The method of claim 5, further comprising:
determining a change impact factor for the group of the plurality of performance metric groups by determining a ratio of the second number to the first number.

7. The method of claim 6, wherein determining the consolidated performance metric for the performance metric domain comprises multiplying the plurality of constituent consolidated performance metrics by the change impact factor.

8. A method, comprising:
transmitting polling requests to a plurality of data processing devices associated with a performance metric domain;
receiving, in response to the polling requests, a plurality of performance metrics from the plurality of data processing devices;
grouping the plurality of performance metrics into a plurality of performance metric groups based on their respective associations with the plurality of data processing devices;
determining, based on the plurality of performance metrics, a plurality of constituent consolidated performance metrics, each of the plurality of constituent consolidated performance metrics corresponding to at least one of the plurality of performance metric groups;
determining, based on the plurality of constituent consolidated performance metrics, a consolidated performance metric for the performance metric domain; and
detecting, based on the consolidated performance metric for the performance metric domain, a change in performance or stability of the plurality of the data processing devices.

9. The method of claim 8, wherein transmitting the polling requests comprises transmitting the polling requests at predefined regular intervals.

10. The method of claim 8, further comprising recording the consolidated performance metric in a log.

11. The method of claim 8, wherein the plurality of data processing devices are associated with a performance metric domain comprising a plurality of data centers.

12. A method, comprising:
transmitting polling requests to a plurality of data processing devices;
receiving, in response to the polling requests, a first plurality of performance metrics from the plurality of data processing devices, the first plurality of performance metrics corresponding to a first time;
receiving, in response to the polling requests, a second plurality of performance metrics from the plurality of data processing devices, the second plurality of performance metrics corresponding to a second time;
determining a first group of performance metrics comprising:
a portion of the first plurality of performance metrics corresponding to a first portion of the plurality of data processing devices, and
a portion of the second plurality of performance metrics corresponding to the first portion of the plurality of data processing devices;
determining a second group of performance metrics comprising:
a portion of the first plurality of performance metrics corresponding to a second portion of the plurality of data processing devices, and
a portion of the second plurality of performance metrics corresponding to the second portion of the plurality of data processing devices;
determining, based on the first group of performance metrics, a first consolidated performance metric for the first portion of the plurality of data processing devices;
determining, based on the second group of performance metrics, a second consolidated performance metric for the second portion of the plurality of data processing devices; and
outputting for display a graph comprising the first consolidated performance metric for the first portion of the plurality of data processing devices and the second consolidated performance metric for the second portion of the plurality of data processing devices.

13. The method of claim 12, further comprising:
detecting, based on the first consolidated performance metric, a change in performance or stability of the first portion of the plurality of data processing devices; and
detecting, based on the second consolidated performance metric, a change in performance or stability of the second portion of the plurality of data processing devices.

14. The method of claim 12, wherein:
determining the first consolidated performance metric comprises multiplying the first group of performance metrics by a first predetermined weighting factor; and
determining the second consolidated performance metric comprises multiplying the second group of performance metrics by a second predetermined weighting factor.

15. The method of claim 12, further comprising:
determining a first number of the first portion of the plurality of data processing devices for which a minimum threshold change has occurred over a time interval substantially spanning from the first time to the second time; and
determining a second number of the second portion of the plurality of data processing devices for which a minimum threshold change has occurred over the time interval.

16. The method of claim 15, further comprising:
determining, based on the first number, a first change impact factor for the first group of performance metrics; and
determining, based on the second number, a second change impact factor for the second group of performance metrics.

17. The method of claim 16, wherein determining the first consolidated performance metric comprises multiplying the first group of performance metrics by the first change impact factor and determining the second consolidated performance metric comprises multiplying the second group of performance metrics by the second change impact factor.

18. The method of claim 12, further comprising recording the first consolidated performance metric and the second consolidated performance metric in a log.

19. The method of claim 12, wherein the plurality of data processing devices are associated with one or more data centers.

20. The method of claim 12, further comprising:
determining a first performance center metric for a first data center based at least in part on the first consolidated performance metric; and
determining a second performance center metric for a second data center based at least in part on the second consolidated performance metric.

* * * * *